(12) United States Patent
Giuliani et al.

(10) Patent No.: US 8,892,881 B2
(45) Date of Patent: Nov. 18, 2014

(54) SPLIT KEY SECURE ACCESS SYSTEM

(75) Inventors: Kenneth J. Giuliani, Woodbridge (CA);
Vijayakumar P. Murty, Toronto (CA)

(73) Assignee: The Governing Council of the University of Toronto, Toronto, Ontario (CA)

( * ) Notice: Subject to any disclaimer, the term of this patent is extended or adjusted under 35 U.S.C. 154(b) by 7 days.

(21) Appl. No.: 13/254,540

(22) PCT Filed: Mar. 3, 2010

(86) PCT No.: PCT/CA2010/000286
§ 371 (c)(1),
(2), (4) Date: Nov. 15, 2011

(87) PCT Pub. No.: WO2010/099603
PCT Pub. Date: Sep. 10, 2010

(65) Prior Publication Data
US 2012/0060033 A1    Mar. 8, 2012

Related U.S. Application Data

(60) Provisional application No. 61/156,915, filed on Mar. 3, 2009.

(51) Int. Cl.
*H04L 29/06* (2006.01)
*H04L 9/06* (2006.01)
*H04L 9/08* (2006.01)

(52) U.S. Cl.
CPC ........... *H04L 9/0631* (2013.01); *H04L 2209/20* (2013.01); *H04L 9/085* (2013.01)
USPC ........................................................ 713/168

(58) Field of Classification Search
CPC . H04L 63/0442; H04L 63/0428; H04L 9/085; H04L 9/0656; H04L 63/067; H04L 63/0457
USPC .......................................................... 713/168
See application file for complete search history.

(56) References Cited

U.S. PATENT DOCUMENTS 5,737,419 A * 4/1998 Ganesan ...................... 713/169
5,796,830 A * 8/1998 Johnson et al. .............. 380/286
(Continued)

OTHER PUBLICATIONS

Binary Arithmetic Coding With Key-Based Interval Splitting; Jiangtao (Gene) Wen et al.; IEEE Signal Processing Letters, vol. 13, No. 2, Feb. 2006.*

(Continued)

*Primary Examiner* — Luu Pham
*Assistant Examiner* — James Turchen
(74) *Attorney, Agent, or Firm* — Norton Rose Fulbright Canada LLP

(57) ABSTRACT

The present invention is a secure access system whereby the key that facilitates entrance to electronic data is split into at least two segments. Electronic data may be accessed by the application of the key segments in combination. A server may be used to derive key segments by way of algorithms, in a manner that improves the bit security of the key. Bit strings generated by the present invention may be concatenated to form data blocks whereby plaintext may be encrypted or ciphertext decrypted. The concatenation of the unique bit string variables and the generation of bit strings of specific sizes, as may occur through padding of blocks, work to provide a secure means of encrypting a key. A different bit string may be generated for each encryption/decryption transmission which limits the opportunity for an adversary to decrypt the plaintext.

20 Claims, 15 Drawing Sheets

(56) References Cited

U.S. PATENT DOCUMENTS

| | | | |
|---|---|---|---|
| 6,185,685 B1* | 2/2001 | Morgan et al. | 713/183 |
| 6,904,020 B1* | 6/2005 | Love et al. | 370/252 |
| 6,934,392 B1* | 8/2005 | Vanstone | 380/278 |
| 6,944,765 B1* | 9/2005 | Rose et al. | 713/181 |
| 7,299,356 B2* | 11/2007 | Mizrah | 713/169 |
| 7,299,357 B2* | 11/2007 | Karamchedu et al. | 713/171 |
| 7,587,045 B2* | 9/2009 | Yeung et al. | 380/43 |
| 7,734,045 B2* | 6/2010 | Sandhu et al. | 380/44 |
| 7,852,850 B2* | 12/2010 | Kopelman et al. | 370/395.32 |
| 2007/0133673 A1* | 6/2007 | Imaizumi | 375/240 |

OTHER PUBLICATIONS

Innovative Key Generation Approach to Encrypt Wireless Communication in Personal Area Networks; Daniel Bichler et al.; IEEE Globecom 2007.*

* cited by examiner

SPLIT KEY SECURE ACCESS SYSTEM

FIELD OF INVENTION

The present invention relates in general to the field of an access control system and more particularly to a split key algorithm for password encryption.

BACKGROUND OF THE INVENTION

The problem of secure encryption of information is of particular concern due to the large amount of sensitive content that is transferred between users. It is critical that such content remain private and beyond the reach of third parties who are not authorized to view such information. Several prior art examples are directed at split-key algorithms for the purpose of secure transfers of content.

US Patent Application No. 2008/0077755 discloses a programmable electronic device that stores a number of ciphertext software modules. The invention utilizes split-keys which, when combined in a predetermined fashion with a token of a user installed on the device, generates the appropriate cipher-key that permits successful decryption of the associated cipher-text software module. One split-key may be created for each cipher-text software module in a one-to-one correspondence. This patent discloses the use of bitwise exclusive-or or bitwise exclusive-nor functions to combine the split-key with the token. A problem this method encounters is that partial knowledge of the split-key and the token may yield partial knowledge of the cipher-key. As a result the security offered by this invention is limited.

US Patent Application No. 2003/0147536 discloses a secure electronic messaging system that permits communication between registered users with the assistance of a key server. The invention involves a database that contains stored information regarding registered users including preferred public encryption keys, key usage information and decryption key information. A digital signature may be included with a string of random bits when a message is sent. The key server confirms that the message was sent by the sender through the recognition of the digital signature. The patent discloses that the protocol requires the encrypted form of the key, not the key itself, to be split into two parts, and that this may be achieved by a method of splitting that is the exclusive-or function.

U.S. Pat. No. 7,114,078 discloses a method and apparatus for storing a user name and password for respective network addresses or universal resource locators (URLs). Such information is encrypted and access to the memory card storage location is controlled. When the card is attached to an electronic device, the password may be utilized to initiate an unlock request. If the request is validated the user name and password associated with a particular URL may be transmitted to the browser on the electronic device requesting the information. The patent discloses binding a URL to a user name and password. Keys in this method are stored in their entirety and are never split.

U.S. Pat. No. 7,152,693 discloses an encryption engine operable to encrypt passwords associated with a plurality of data servers which may be accessed in response to a client request. A key-based encryption algorithm may be applied and ciphertext corresponding to each password may be stored in a passwords storage means. A decryption engine may apply a key-based decryption algorithm corresponding to the key-based encryption algorithm to decrypt the ciphertext. The patent discloses that passwords are encrypted only for storage purposes. When a retrieval request is submitted, the password is decrypted and transmitted in unencrypted form. The keys are stored in their entirety and are never split.

U.S. Pat. No. 6,668,323 discloses a data processing system-based password protection system that applies a user selected password to protect a resource. The password and an encryption key unique to the resource and at least partially derived from the resource may be stored in a data processing system. To access the resource a user must enter a password that matches the stored access password. A forgotten password may be recovered from the encrypted password and the unique information. The method disclosed in this patent creates a password from two sources: the unique information and a master password. The invention does not involve a step whereby a key is split into two or more parts.

U.S. Pat. No. 1,310,719 discloses a method whereby signals may be enciphered. In accordance with a rule represented the characters are represented by a number of periods of different current values thereby altering the normal code impulses of a character to be transmitted. In this invention, the cipher may be changed for each letter transmitted. This invention discloses the use of an exclusive-or function and its generalization as an encryption method. It makes no use of split keys.

U.S. Pat. No. 7,386,720 discloses techniques for user authentication based upon an asymmetric key pair including a public key and a split private key. The techniques of this invention facilitate authentication of a user to a networked device. The public key is known to at least a merchant user and is stored on a merchant server in association with a user ID. The private key is made up of at least two factors, including a user's password and a non-exportable key stored on a user's device or another private key stored elsewhere. This invention imposes certain limitations, such as a limitation on a user's ability to perform the protocol on different devices. The key is split using public-key methods and therefore its security is based on computational security rather than information-theoretic security. Furthermore, the requirement that the public key be known to each merchant server obligates the merchant server to collaborate with the user in the protocol, and requires key management.

PassPack is a company which offers password encryption and retrieval products. The product uses a passphrase to encrypt a password encryption key. The method applied does not involve splitting of the encryption key itself. Instead, individual passwords are encrypted by exclusive-or-ing the encrypted AES value of a random string. A problem encountered by this method is that should an intruder learn the passphrase the security of the system is lost.

The OpenID consortium is formulating protocols and standards for an ID management tool which operate using certificates and public keys. A disadvantage of the system of OpenID is that it is bulky and must involve collaboration with other websites.

SUMMARY OF THE INVENTION

In one aspect the present invention is a secure access system for protecting access to electronic data characterized in that it comprises: a server operable to protect access to the electronic data by utilizing a key; a computing means operable to allow a user to input user data, said computing means being linked to the server so that computing means is operable to transfer the user data to the server; and one or more algorithms operable by the server to derive the key, said one or more algorithms further being operable to split the key into at least two key segments and at least one of the at least two key segments incorporates the user data; whereby all of the at least two key segments must be known to form the key, and the key must be provided to the server in order for the server to provide access to the electronic data.

In another aspect the present invention is a method of protecting access to electronic data by way of a key, characterized in that it comprises the steps of: a user inputting user data into a computing means; transferring the user data from the computing means to a server that is linked to the computing means, said server being operable to apply one or more algorithms; applying the one or more algorithms to derive the key and to divide the key into at least two key segments, at least one of the one or more key segments incorporating the user data; requiring that the key, incorporating all of the at least two key segments, be provided to the server; the server recognizing the key and granting access to the electronic data based upon the key.

In yet another aspect the present invention is a program product, characterized in that it comprises: a server operable to provide access to electronic data that is protected by a key; a computing means whereby a user to input user data, said computing means being operable to facilitate the transfer of the user data to the server; protection software, embodied within the server, that protects access to the electronic data by applying one or more algorithms that utilize the user data to derive the key, whereby at least two key segments are derived by the one or more algorithms and such key segments must be provided in a manner that forms the key in order for the server to provide access to the electronic data.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
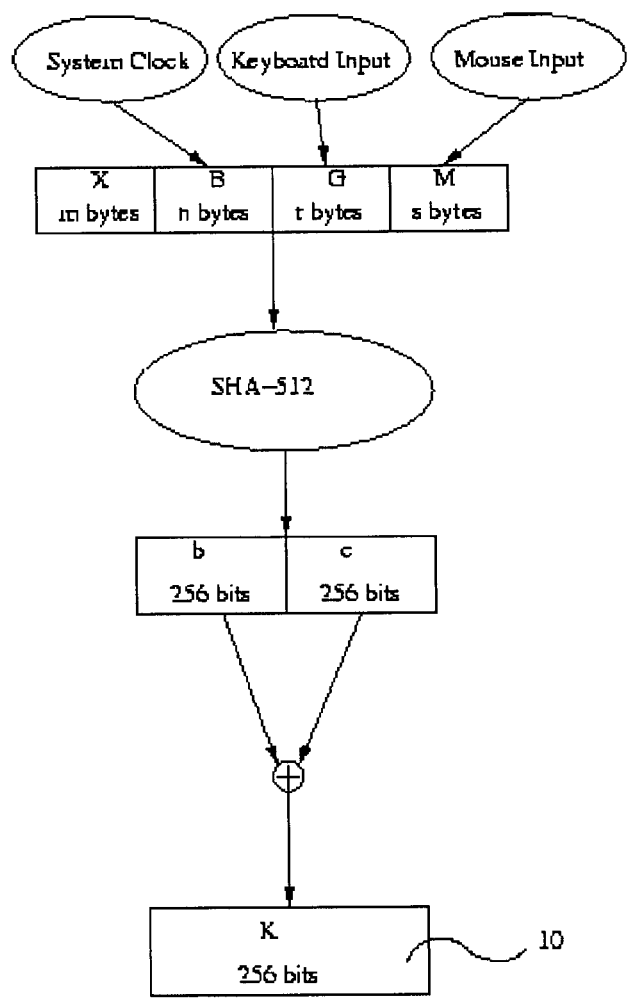
FIG. 1 is a flow-chart of a static key generation algorithm.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a secure access system whereby a key that facilitates entrance to electronic data may be split into at least two segments. Electronic data may be accessed by the application of the key segments together. Key segments may be controlled by a user through the use of a passphrase, which may be inputted by way of a computer means. The passphrase may be applied as a segment of the key. A server may be used to derive other segments of the key in a manner that improves the bit security of the key. The security of a key correlates to the ease with which a third party may break the key, or may derive a segments of the key, and thereby manage to access the electronic data the key is meant to protect. In the secure access system of the present invention the revelation of a segment of the split key to a third party up to a certain threshold, will not be sufficient for the third party to break the key. Knowledge of a key segment will not allow a third party to derive the bits of the key as a whole.

The method of the present invention may apply a series of algorithms. These algorithms may involve xor-ing an encryption bit string to the plaintext. The algorithms may further involve generating the bit string by hashing and then AES'ing a message. The result of the algorithms applied by the present invention may be an encryption bit string that is different for every distinct value encrypted. This enhances security because the present invention restricts the amount of information that an adversary may learn regarding the plaintext. A different encryption bit string is generated each encrypted transmission which limits the opportunity for an adversary to decrypt the plaintext.

An example of the algorithms of the present invention may include any or all of the following. One algorithm applied may generate a pseudorandom bit string E for each URL. This generation of E may occur when the user first registers the URL with the server and E may be recalculated whenever the user changes information bound to this URL. The result is that a different encryption value may be applied by the system for each URL. Multiple values may be associated with a particular URL and these may be tracked with a counter variable j, whereby the value of j is different for each value associated with a URL so that the encryption bit strings for different data, represented as variables, that are bound to the same URL will be different because each will have a different counter value for j embedded therein. Algorithms applied by the present invention may further divided data into blocks, so that if the whole of a data string is greater than the block size, the data string may be divided into multiple blocks. An index i may be assigned to each block and additionally blocks may be padded with extra characters to obscure number of plaintext characters.

A user may enter user information, such as a passphrase. Upon choosing a passphrase a static key K, the user's passphrase C, and the pseudorandom bit string S may be generated. Upon a change of the passphrase by a user, a new bit string for C may be produced, along with new bit strings for K and S. While the passphrase remains unchanged by a user C, K and S may be static. In one embodiment of the present invention choosing a passphrase C may cause two bit strings $d_1$ and $d_2$ to be generated that are private keys. The bit strings $d_1$ and $d_2$ may be derived from the passphrase C and may further be utilized to encrypt K. When the passphrase C is altered $d_1$ and $d_2$ may be regenerated, but otherwise $d_1$ and $d_2$ may remain static. The variables $d_1$ and $d_2$ and S may be utilized to encrypt static key K into the values $x_1$ and $x_2$. Upon calculation of encrypted values $x_1$ and $x_2$, bit string S may be discarded.

The bit strings generated by the present invention may be concatenated to form data blocks whereby plaintext may be encrypted. The concatenation of the unique variables, the division of the whole of the plaintext and variables into blocks of specific sizes, as well as the padding of blocks that are less than the full size without padding, all work to provide a secure means of encrypting plaintext into ciphertext. The security of the system lies in the fact that in order to break the encryption an intruder will need to know more information than the password of the user, or a particular encryption key segment. To decrypt the ciphertext an algorithm that reads the blocks to disassemble the segments and to remove any padding, may be applied.

The secure access system of the present invention may involve several elements, including key segments and a user passphrase. It may further apply elements including a computer or other data input means, for example, such as a cellular phone, or personal data assistant device. A server may used to derive one or more additional key segments. For example, the client pass phrase derives part of the key and the server derives the other part of the key. Moreover a communication means may be applied so that the data input means may transmit information to and receive information from the server. This communication means may be through a direct link, may be wireless, or may be by other means. The additional key segments derived by the server may be derived by one or more algorithms. For this reason, a means of storing the algorithms and applying these, either by way of the server or another means, may be applied. It is possible that the server may utilize the passphrase to derive the additional key segments. The server of the secure access system may be operable to run a symmetric key recovery process.

In one embodiment of the present invention, it may be utilized to provide secure access to electronic data from anywhere in the world via the Internet or other remote access means. In such an embodiment the server may be operable to generate a link to the Internet or other remote access means.

The present invention offers several benefits over known prior art secure access systems. In particular, the present invention may offer an efficient means of providing security. Efficiency is achieved due to the streamlined method of the present invention which functions in a manner that may operate more quickly than prior art, such as known encryption systems.

Another benefit of the present invention is increased security over prior art systems. Known prior art, such as encryption systems, can be prone to attack. For example, prior art systems may operate so that if a passphrase is known to an intruder the security of the system is lost. Such systems experience diminished security. The prior art incorporates a split key which operates so that an intruder to the system will be unable to access secure information without breaking the unique key generated for each encryption/decryption transaction.

Still another benefit of the present invention is that it may be accessed directly through remote means. Known encryption systems cannot be accessed directly through remote means. For example, Open ID requires collaboration with other websites. The present invention does not rely upon other websites, which further increases the security of the present invention as the key segments and electronic data do not have to have contact with other websites.

An additional benefit of the present invention is that the system and method may be applied to a variety of uses, including personal and business uses. Known prior art access systems, such as encryption systems, are created specifically for business or personal use applications. Consequently, the prior art systems are operable for only one type of use. The result is that such prior art systems and methods frequently lack facilities that are required for other types of use which limits the application of the system.

One embodiment of the present invention may involve a user providing user login information to the system. User login information may include a password and a username, although a skilled reader will recognize that user login information may include other data or elements. In this application user login may be referenced as plaintext. The user login information may be transferred between a client and a server and may be in an encrypted when transferred.

The user login information may be encrypted by an encryption algorithm. This encryption algorithm may involve xoring an encryption bit string to the plaintext. The bit string may be generated by hashing and then AES'ing a message. In the present invention, in order to enhance security, the encryption bit string may be different for every distinct value encrypted. This enhances security because when the same encryption bit string is used for different values an adversary can determine information about the plaintext. If the adversary determines sufficient information, the adversary may be able to decrypt the plaintext. The present invention restricts the amount of information that an adversary may learn regarding the plaintext by applying a different encryption bit strict for every distinct value encrypted and thereby limits the opportunity for the adversary to decrypt the plaintext.

In one embodiment of the present invention a URL may be bound to user login information. For the purpose of this application a URL will be represented as U and may be understood to be a sequence of ASCII characters. Such a sequence of ASCII characters may be a bit string in its ASCII representation.

A different pseudorandom bit string E may be assigned to each U. For the purpose of this application the bit string E may represent a pseudorandom bound to a particular URL/username/password instance. E may be of varying lengths, for example, such as a 256-bit string. It may not be necessary to keep E secret.

Figure 2:
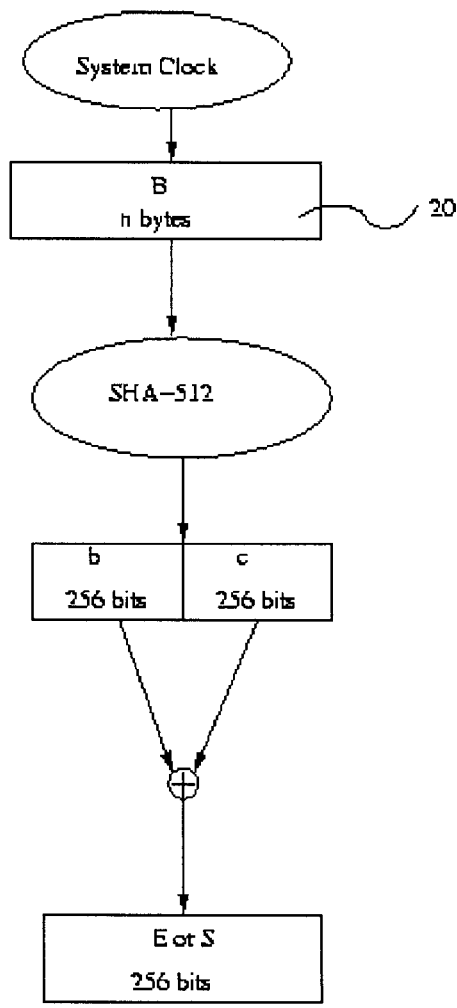
FIG. 2 is a flow-chart of a pseudorandom bit generation.

In one embodiment of the present invention a process of pseudorandom bit generation may be applied as shown in FIG. 2. Such a process may be utilized to generate E as well as other pseudorandom bit strings utilized by the present invention. The process may involve recording the system clock time into a bit string B 20 of length n bytes. A bit hash a may be computed through an equation such as:

$$a = SHA\text{-}512(B)$$

This equation is presented as an example of an equation that may be used to compute a 512-bit hash a. Other equations may be applied to compute a of varying lengths. Once computed, a may be divided into smaller bit strings, such as two 256-bit strings b||c. The smaller bit strings may be utilized to compute a bit pseudorandom bit string, such as E, by xor. For example, a 256-bit xor E may be computed as b xor c. A skilled reader will recognize that other processes may be applied to generate pseudorandom bit strings utilized by the present invention.

E may be generated when the user first registers the URL with the server. E may be recalculated whenever the user changes information bound to this URL. For example, E may be recalculated when a user changes his or her password for the website corresponding to the URL. The method of calculating E and recalculating E may generate new encryption values and thereby may cause a different encryption value to be applied by the system.

The calculation and recalculation of E as well as other elements of the key, may cause multiple fields to correspond to the same URL. To keep track of these the present invention may apply a counter represented as j. In this application j is understood to be a counter variable. The variable j may be assigned a different value for each encrypted field assigned to a URL. For example, a first variable, which may be represented as j=1, may correspond to plaintext that is the username; whereas a second variable, which may be represented as j=2, may correspond to plaintext that is the password. A skilled reader will recognize that a variety of variables may correspond to the same URL and be plaintext, or segments of plaintext, and that the counter may be applied in increments to each variable.

Counter j may be used to distinguish the encryption bit strings for different data, represented as variables, that are bound to the same URL are different. For example, if the data bound to a URL consists of two usernames and a password, then the following values for j can be assigned: for a first username j=1, for a second username j=2, and for a password j=3. In one embodiment of the present invention, the counters may be the ASCII character representation of the strings ranging numerically from '0001' to '9999'.

One embodiment of the present invention may represent ASCII character data as a bit string in the form of the characters' ASCII representations. In another embodiment of the present invention data may be divided into blocks. In such an embodiment, if the data is greater than the block size multiple blocks may be used. For example, the present invention may apply an encryption method that utilizes AES. Should a version of AES that has a block size of 128 bits (or 16 ASCII characters) be applied, data that has more than 16 ASCII characters may be divided into multiple blocks. A block may be assigned an index represented as i, which may be a number. For the purpose of this application, i may represent the index of a block, used when encrypting plaintexts. In the case of multiple blocks a different number may be assigned to i so that each block will be the i-th block. The value i may be part of the encryption string for a block. Assigning a unique i value for each block may represent a means of ensuring that the encryption bit string for each block is different. A skilled reader will recognize that other means of ensuring that the encryption bit string for each block is different may be applied.

An additional means of ensuring the encryption bit string for each block is unique is by padding a block with fixed non-used ASCII character. A block may be padded if the plaintext does not fill out the block. A fixed non-used ASCII character may be of several types, for example, such as a SPACE character. The result of padding the block may be to obscure the number of characters within a plaintext. When the block is padded it may be difficult to distinguish the plaintext characters from the padding characters and therefore the number of characters within the plaintext will be underterminable.

In one embodiment of the present invention, password encryption may be performed through the use of a key K. The key K may be of varying lengths, for example 256-bits, which is the same length as the private static key used for password encryption. K may be a pseudorandom and may be generated through random input. For example, random text input may be generated by a user or by random actions from a mouse. A skilled reader will recognize that other means of generating random input may be applied. K may be kept secret. A new value for K may be generated every time a user changes its passphrase.

In one embodiment of the present invention, as shown in FIG. 1, the following process may be utilized to generate static key K 10. A user may input a global username X into the system. X may be a character string of m characters. The system may record the system clock time as a bit string B of a length of n bytes. The system may further record random string G of a length of r bytes which may be typed by the user. The system may also record random mouse input M of a length of s bytes, as provided by the user. The X, B, G and M may be utilized to form a concatenated string X∥B∥G∥M. Using this string a bit hash a may be computed by way of equation:

$$a = SHA\text{-}512(X \| B \| G \| M)$$

A skilled reader will recognize that alternative equations may be utilized to compute a as a length other than 512-bit hash. Once computed, a may be divided into smaller bit strings, such as two 256-bit strings b∥c. The smaller bit strings may be utilized to compute K by xor. For example, a 256-bit xor K may be computed as b xor c. A skilled reader will recognize that other processes may be applied to generate K.

A user's passphrase may be generated as a long sentence which the user may easily remember. The sentence is represented as a sequence of ASCII characters. For the purposes of this application a passphrase may be represented as C.

Additionally a pseudorandom bit string may be used to encrypt static key K. For the purpose of this application such a pseudorandom bit string may be represented as S. Bit strings of varying lengths may be applied as S, for example, such as a 256-bit pseudorandom bit string. S may be kept secret.

Upon a user choosing a passphrase a static key K, the user's passphrase C, and the pseudorandom bit string S may be generated. Upon a change of the passphrase by a user, whereby a new bit string for C is produced, new bit strings for K and S may also be generated. While the passphrase remains unchanged by a user C, K and S may be static.

In one embodiment of the present invention choosing a passphrase C may cause two bit strings $d_1$ and $d_2$ to be generated. These two bit strings may be held as private keys. $d_1$ and $d_2$ may be derived from the passphrase C and may further be utilized to encrypt K. When the passphrase C is altered $d_1$ and $d_2$ may be regenerated and may otherwise remain static.

Figure 9:
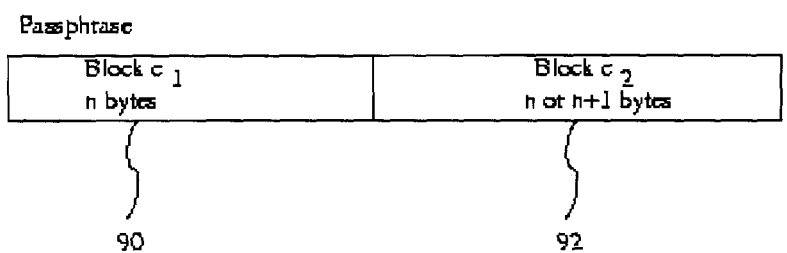
FIG. 9 is a representation of a passphrase split into blocks by the client private-key generation algorithm.
Figure 10:
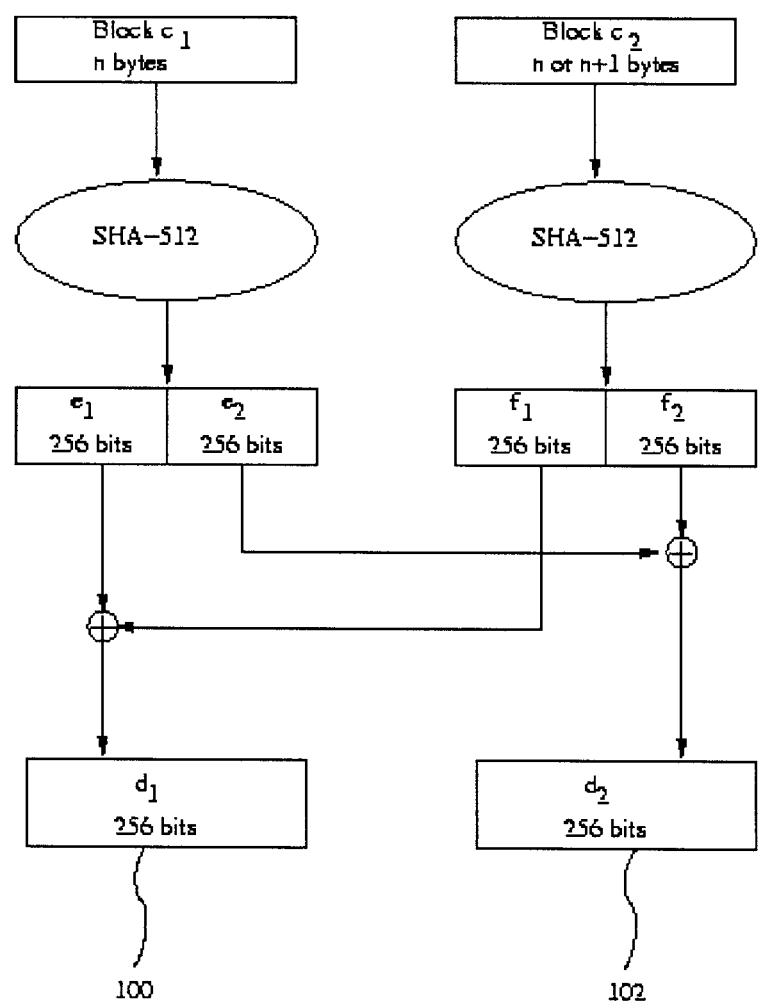
FIG. 10 is a flowchart of the client private-key generation algorithm.

In one embodiment of the present invention, as shown in FIG. 10, a client private key generation algorithm may be utilized to generate private key bit strings $d_1$ and $d_2$. This algorithm is presented as an example, as a skilled reader will understand that other algorithms may be applied. Additionally, the example algorithm generates private key bit strings of a length of 256 bytes each. A skilled reader will recognize that bit strings of other lengths may be utilized in the present invention as input, elements and output. The algorithm may require input of a passphrase character string C of m≥16. The system may convert C to a bit string c having a length 8 m through a method of associating each character to its 8-bit ASCII representation. C may be split into multiple bit strings, for example into two bit strings $c_1 \| c_2$. The result may be that $c_1$ 90 consists of the left-most n=[m/2] bytes of c and $c_2$ 92 consists of the right-most m−n bytes of c, as shown in FIG. 9.

As shown in FIG. 10, two 512-bit hash values e and f may be computed in the following manner:

$$e = SHA\text{-}512(c_1)$$

and $$f = SHA\text{-}512(c_2)$$

e may be divided into two 256-bit strings $e_1 \| e_2$. f may also be divided into two 256-bit strings $f_1 \| f_2$. Private key bit strings $d_1$ 100 and $d_2$ 102 may be generated as 256-bit xor values computed by utilizing the following equations:

$$d_1 = e_1 \text{ xor } f_1$$

and $$d_2 = e_2 \text{ xor } f_2$$

If the either $d_1$ or $d_2$ corresponds to the integer values 0 or 1 the algorithm may fail and a message may be presented to the user to alert the user to the failure. In the instance of failure the user may enter a different passphrase C and the algorithm may be repeated using the new passphrase C.

$d_1$ and $d_2$ and S may be utilized to encrypt static key K into the values $x_1$ and $x_2$. Upon calculation of encrypted values $x_1$ and $x_2$, bit string S may be discarded. $x_1$ and $x_2$ may be bit encryption values of varying lengths, for example, such as 512-bit encryption values of K. The encryption values $x_1$ and $x_2$ may be public.

Figure 11:
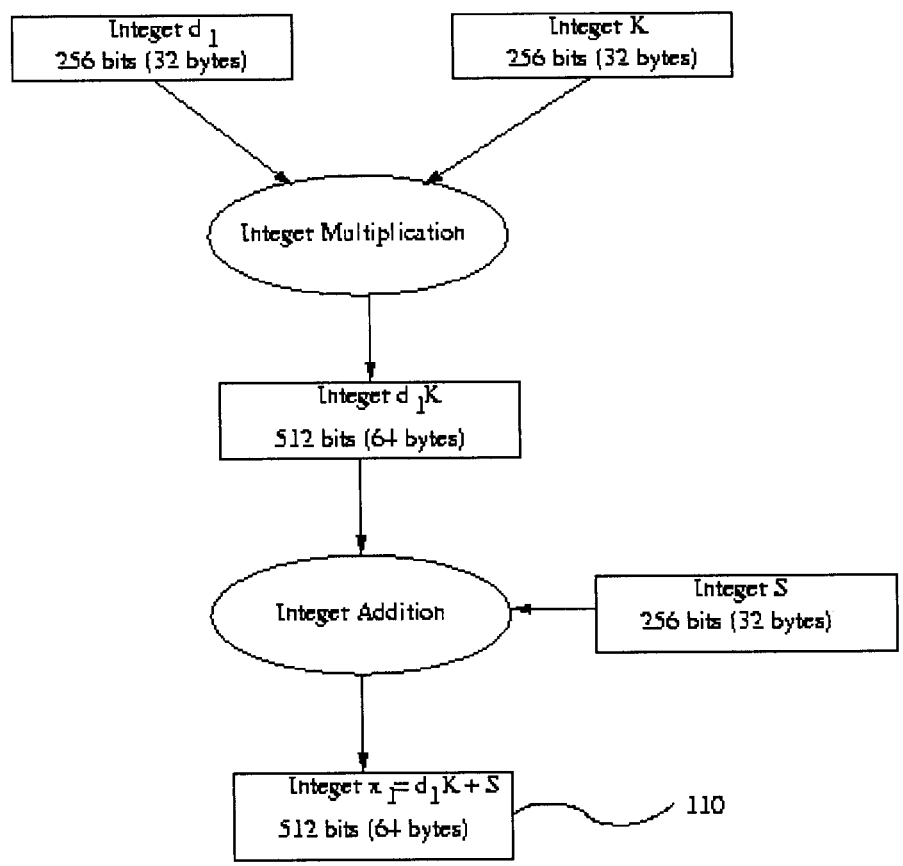
FIG. 11 is a flowchart of the server-assisted client public-key generation algorithm.

In one embodiment of the present invention, a server-assisted client public-key generation algorithm may be utilized to generate public key bit strings $x_1$ and $x_2$. This algorithm is presented as an example, a skilled reader will understand that other algorithms may be applied. Additionally, the example algorithm generates public key bit strings of a length of 512 bytes each. A skilled reader will recognize that bit strings of other lengths may be utilized in the present invention as input, elements and output. A private static key bit string K of a length of 256 bits, a private pseudorandom bit string S of a length of 256 bits and private passphrase bit strings $d_1$ and $d_2$ may be provided for use in the algorithm. Bit strings K, S, $d_1$ and $d_2$ may be converted to integer values. As shown in FIG. 11, integer x/110 may be computed through the following equation:

$$x_1 d_1 K + S$$

and integer $x_2$ may be computed through the following equation:

$$x_2 = K + d_2 S$$

Figure 12:
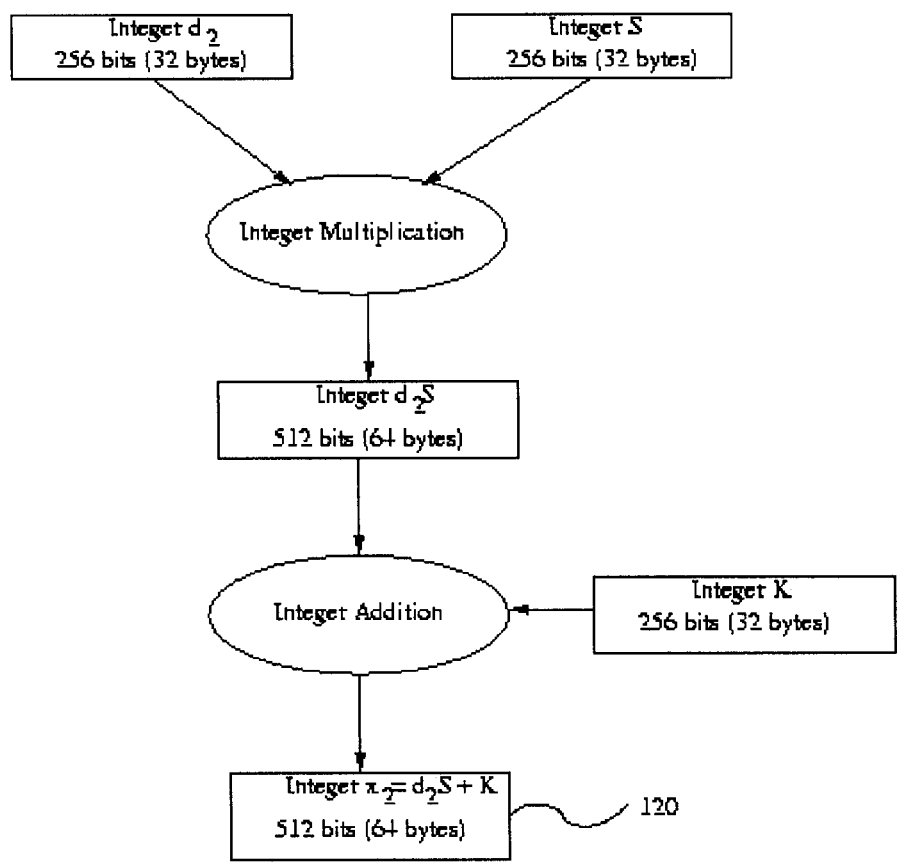
FIG. 12 is a flowchart of a conversion applied by the server-assisted client public-key generation algorithm.

Integers $x_1$ and $x_2$ may be then be converted to bit strings. As shown in FIG. 12, the bit strings may have a length 512 bits. Unused space in the string may be padded on the left with zero bits if this is necessary to reach the appropriate bit string length. The result is public key bit strings $x_1$ and $x_2$ 120.

Figure 13:
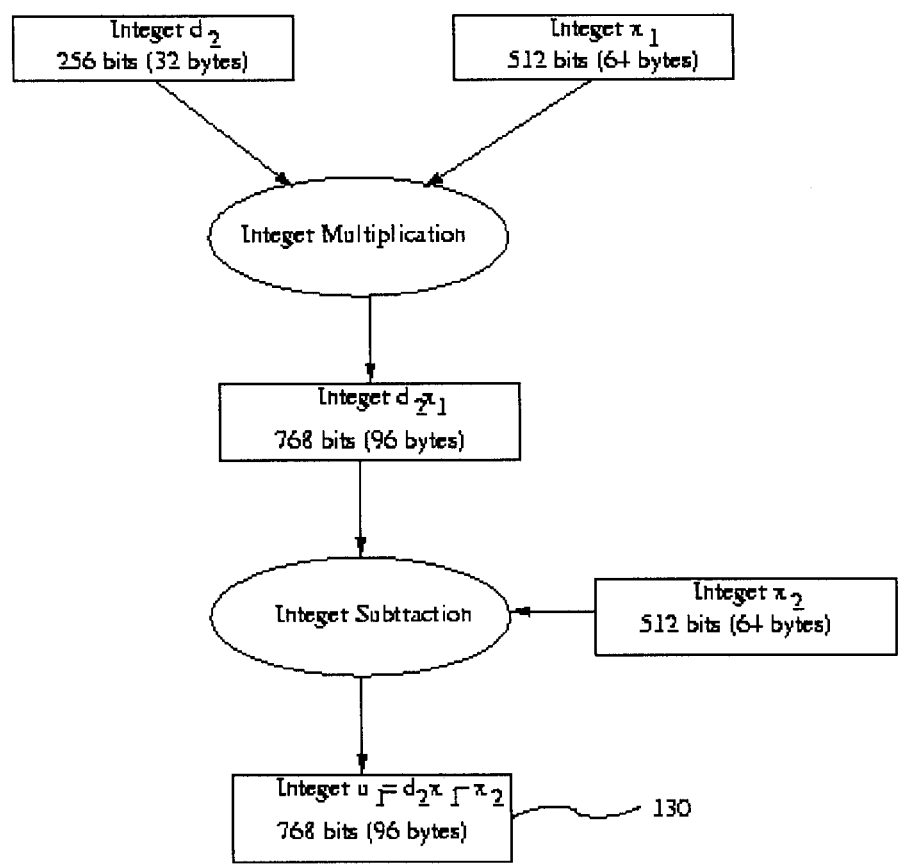
FIG. 13 is a flowchart of a server-assisted client private-key recovery algorithm.

In another embodiment of the present invention, a server-assisted client private-key recovery algorithm may be utilized to generate private static key bit string K. This algorithm is presented as an example, a skilled reader will understand that other algorithms may be applied. Additionally, the example algorithm generates private key bit string of a length of 256 bytes. A skilled reader will recognize that bit strings of other lengths may be utilized in the present invention as input, elements and output. Bit strings $x_1$ and $x_2$ may be obtained from the server and private passphrase bit strings $d_1$ and $d_2$, each of 256 bits, may be generated from the private passphrase. Bit strings $d_1$ and $d_2$, and $x_1$ and $x_2$ may be converted to integer values. As shown in FIG. 13, the integer values may be utilized to compute integer $u_2$ using the following equation 130:

$$u_1 = d_2 x_1 - x_2$$

Figure 14:
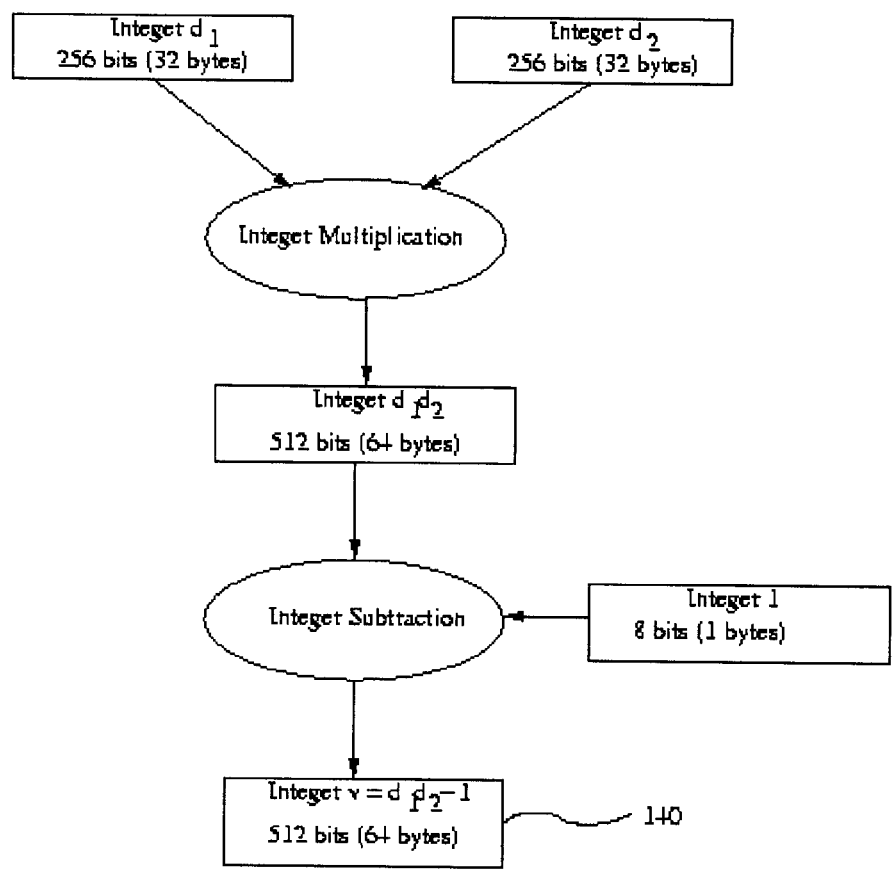
FIG. 14 is a flowchart of a computation applied by the server-assisted client private-key recovery algorithm.

As shown in FIG. 14, Integer v 140 may be computed using the following equation:

$$v = d_1 d_2 - 1$$

Figure 15:
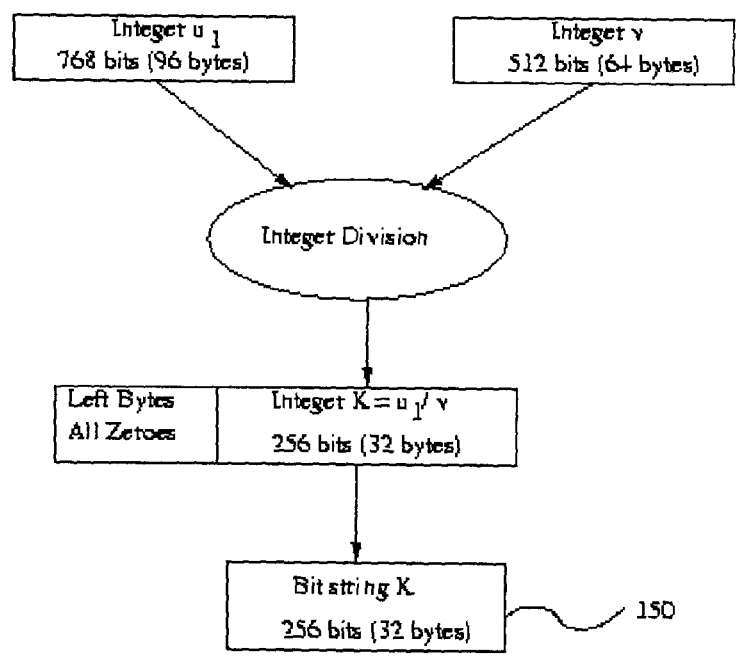
FIG. 15 is a flowchart of a computation applied by the server-assisted client private-key recovery algorithm.

As shown in FIG. 15, integers $u_1$ and v may be applied to compute integer K 150 using the following equation:

$$K = u_1 / v$$

At this point it may be possible to convert K to a bit string. The bit string may be 256 bits in length. If necessary, the left-most zero bits may be stripped from the bit string so that it is the appropriate length.

To augment the security of the present invention, a user should never encrypt the same K with the same passphrase C and a different value for S. In such a situation it may be possible for an adversary to determine the key K. Such a determination diminishes the security provided by the access control system of the present invention.

Additionally, it may be necessary that no two values for E or S be the same. For this reason it may be important that the bit strings E and S be generated pseudorandomly.

The system of the present invention may incorporate several processes and algorithms. Some of these are described below. A skilled reader will recognize that the processes and algorithms described herein are provided as examples and that other processes and algorithms may be applied to the present invention.

In one embodiment of the present invention a password encryption algorithm may be applied to create ciphertexts R. A skilled reader will recognize that while specific bit string lengths are referenced in this example, other bit string lengths may be applied. Plaintext P that represents plaintext to be encrypted may entered by a user or derived from another source. Plaintext may be any text, for example, such as a username or a password. P may be a character string of a length of m bytes. A URL, represented as U, may be a character string of n bytes. A pseudorandom key E, which may be an ephermeral key, may be a bit string of a length of 256 bits. Counter variable j may be utilized to distinguish the encryption bit strings for different data that are represented as variables. As discussed previously, for example, different counter variables may be applied to encryption bit strings that are bound to the same URL to ensure the strings are distinct. For the purpose of this algorithm counter j may be a 4-bit ASCII representation of the decimal number j. These inputs may be applied by the algorithm to produce ciphertexts R, being an encrypted value of a plaintext.

Plaintext P may be considered as a bit string having a length of 8 m. For this purpose the 8-bit ASCII representation of each character may be utilized. P may be divided into blocks $P_1$ through $P_r$, through the following equation of dividing P into:

$$r = [(8m-1)/128] + 1$$

Figure 3:
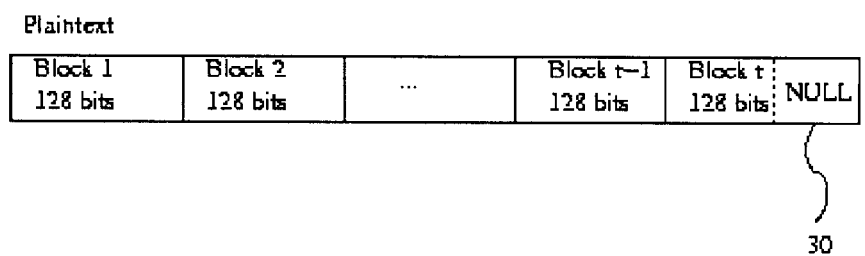
FIG. 3 is a representation of plaintext as a bit string as generated by the pseudorandom bit generator.

Each block, $P_1$ through $P_r$, may have a length of 128 bits (16 bytes). In the instance that the last block has fewer than 128 bits, the block may be padded with ASCII NULL 30 characters, as shown in FIG. 3.

URL U 40 may be considered as a bit string having a length of 8 n. For this purpose the 8-bit ASCII representation of each character may be utilized. Each block may be applied individually in accordance with the steps shown in FIG. 4.

Each block, being an i-th plaintext block, may be applied to the input variables to form a concatenated string as follows:

$$U\|E\|j\|i$$

In this concatenated string j and i may be the 4-character ASCII representation of the decimal numbers j and i in big-endian order, that is, where th least significant digit of the numbers j and i appear on the right. Using this concatenated string $a_i$, which may be a 512-bit hash string, may be calculated in accordance with the following equation:

$$a_i = SHA\text{-}512(U\|E\|j\|i)$$

At this point $a_i$ may be divided in 4, to form four 128-bit string as follows:

$$b_i\|c_i\|d_i\|e_i$$

It may now be possible to compute the xor $f_i$, which may be a 128 bit string, in accordance with the following equation:

$$\text{xor } f_i = b_i \text{ xor } c_i \text{ xor } d_i \text{ xor } e_i$$

Figure 4:
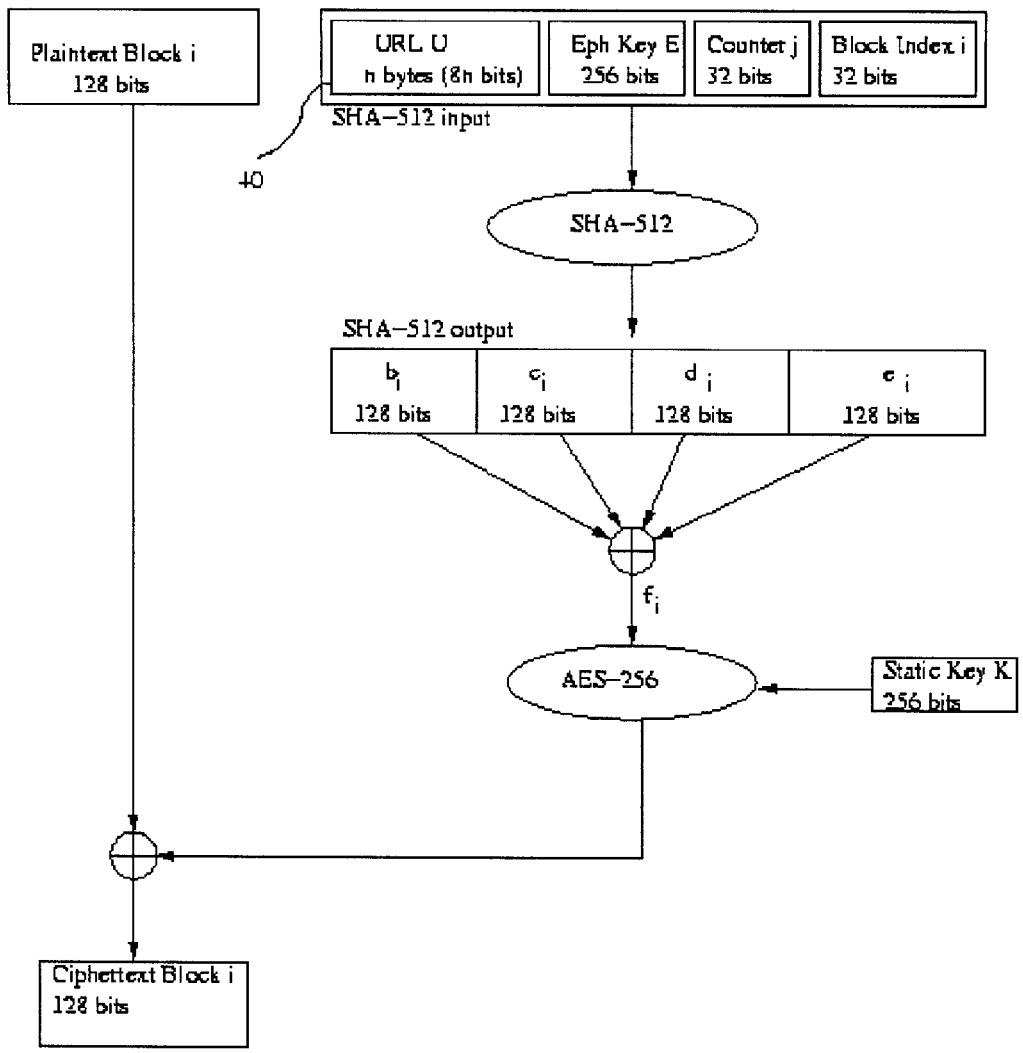
FIG. 4 is a flowchart of the computation of a ciphertext block as applied by the pseudorandom bit generator.

As shown in FIG. 4, an AES encryption value of $g_i$ may now be computed, which may be a 128-bit value, in accordance with the following equation:

$$g_i = AES_K(f_i)$$

Figure 5:
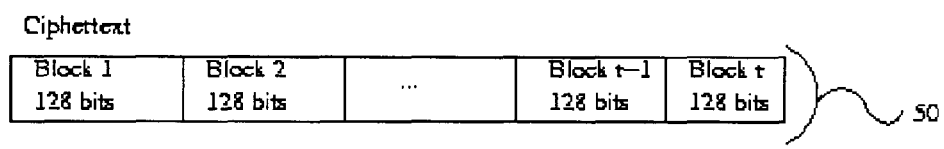
FIG. 5 is a representation of ciphertext as a bit string as formed by the pseudorandom bit generator.

As shown in FIG. 5 a ciphertext block $R_i$, which may be 128-bits in length and the i-th block, may be computed using the following equation:

$$R_i = g_i \text{ xor } P_i$$

All ciphertext blocks that result from repeating the above steps for each i-th plaintext block may be concatenated to form the ciphertext R 50.

In one embodiment of the present invention the following password decryption algorithm may be applied. A skilled reader will recognize that while specific bit string lengths are referenced in this example, other bit string lengths may be applied. The algorithm gathers several variables as input. Ciphertext R may be a character string consisting of a length of r blocks of length of 128-bits each. A URL, represented as U, may be a character string of n bytes. A private static key K may be a bit string of a length of 256-bits. A pseudorandom bit-string E may be a bit string of a length of 256 bits. Counter variable j may be utilized to distinguish the encryption bit strings for different data that are represented as variables. As discussed previously, for example, different counter variables may be applied to encryption bit strings that are bound to the same URL to ensure the strings are distinct. For the purpose of this algorithm counter j may be a 4-bit ASCII representation of the decimal number j. These inputs may be applied by the algorithm to produce plaintext P, which may be a character string of m bytes.

Figure 6:
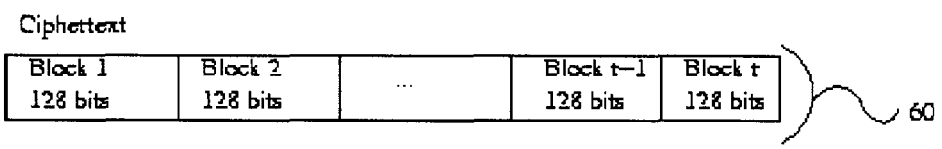
FIG. 6 is a representation of ciphertext as a bit string as applicable to a password decryption algorithm.
Figure 7:
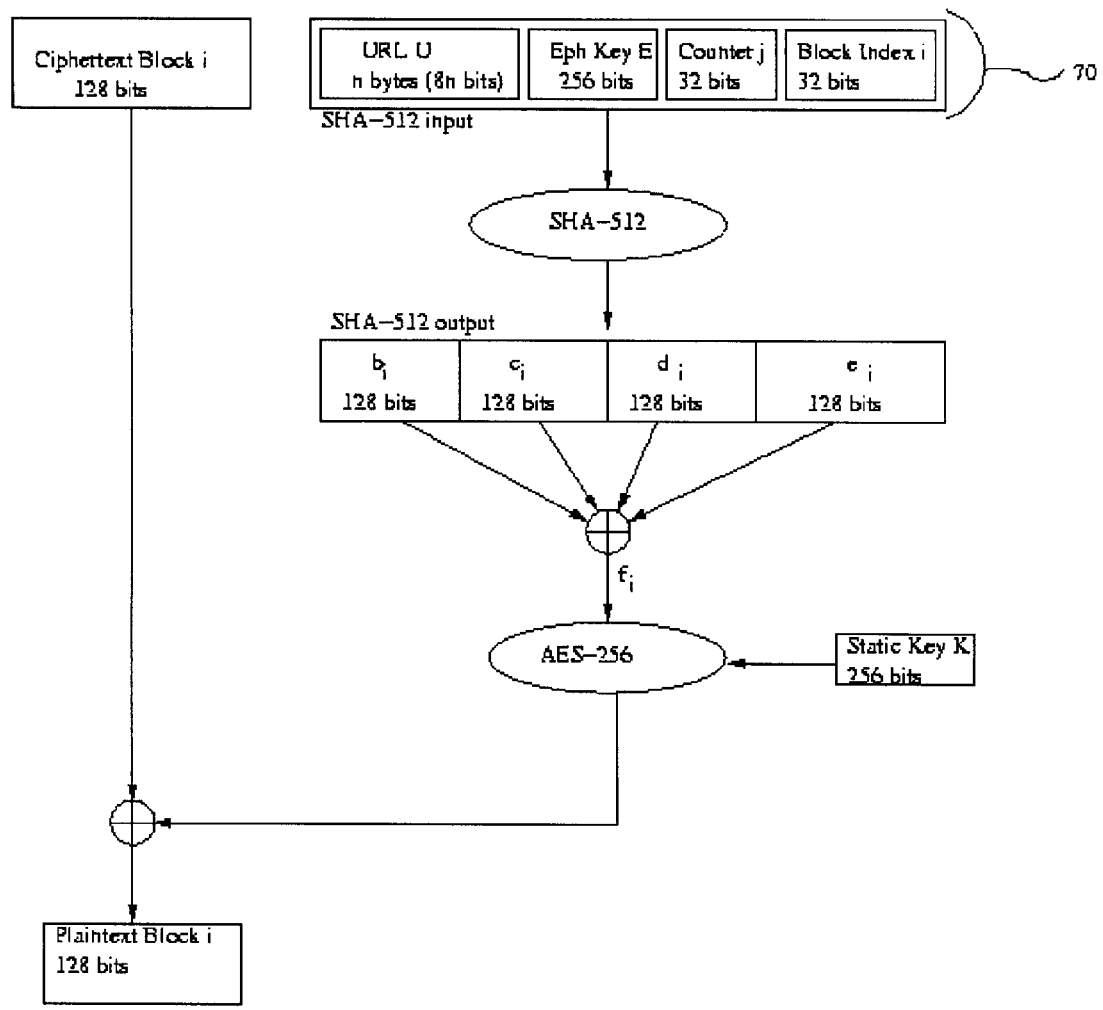
FIG. 7 is a flowchart of the computation of a plaintext block utilizing the password decryption algorithm.

Each ciphertext R may be considered as a bit string having a length of 8 m. This may be accomplished by using the 8-bit ASCII representation of each character in the ciphertext R. In this manner R 60 may be divided into t blocks, represented as $R_1$ through $R_t$. Each block may have a length of 128-bits (16 bytes), as shown in FIG. 6. URL U may e considered as a bit string having a length of 8 n. This may be accomplished by using the 8-bit ASCII representation of each character. Each block may be applied individually in accordance with the steps shown in FIG. 7.

Utilizing the i-th cipherblock and the input variables, it is possible to create a concatenated string 70 as follows:

$$U\|E\|j\|i$$

In this concatenated string j and i may be 4-character ASCII representations of the decimal numbers j and i. It is now possible to compute $a_i$ by applying the following equation:

$$a_i = SHA\text{-}512(U\|E\|j\|i)$$

For the purpose of this example, $a_i$ may be a 512-bit hash. It is now possible to divide $a_i$ into 4, whereby each of the four segments may be a 128-bit string, in the following manner:

$$b_i\|c_i\|d_i\|e_i$$

Utilizing these segments $f_i$ may be calculated, which may be a length of 128-bits, through the following equation:

$$f_i = b_i \text{ xor } c_i \text{ xor } d_i \text{ xor } e_i$$

An AES encryption value $g_i$ may be calculated, which may have a length of 128-bits, through the following equation:

$$g_i = AES_K(f_i)$$

Figure 8:
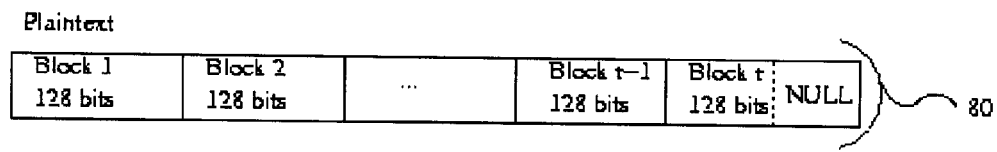
FIG. 8 is representation of plaintext as a bit string as formed by the password decryption algorithm.

As shown in FIG. 8, the i-th plaintext block $P_i$ 80, which may be a 128-bit plaintext block, may be calculated through the following equation:

$$P_i = g_i \text{ xor } R_i$$

All plaintext blocks that result from repeating the above steps for each i-th ciphertext block may be concatenated. All NULL characters of the last block may be stripped. The result is the character string of plaintext P.

It will be appreciated by those skilled in the art that other variations of the embodiments described herein may also be practiced without departing from the scope of the invention. Other modifications are therefore possible.

We claim:

1. A system for protecting access to electronic data comprising:
    a server configured to provide access to the electronic data encrypted by a key; and
    a computing device comprising at least one memory, and at least on processor configured to:
        receive user data,
        generate at least two first key segments using at least a portion of the user data,
        generate at least two second key segments using the at least two first key segments and the key, the key required to access the electronic data,
        regenerate the at least two first key segments,
        recreate the key, K, using the at least two first key segments and the at least two second key segments using the equation:

$$u_1 = d_2 x_1 - x_2;$$

$$v = d_1 d_2 - 1; \text{ and}$$

$$K = u_1 / v_1;$$

wherein $d_1$ and $d_2$ are the first key segments, and $x_1$ and $x_2$ are the second key segments.

2. The system of claim 1 wherein each key segment is one or more encryption bit strings and each of the one or more encryption bit strings is generated to be different for every distinct value encrypted.

3. The system of claim 1 wherein the computing device is configured to generate a bit string by hashing and encrypting the user data using Advanced Encryption Standard (AES); and undertake xor-ing of an encryption bit string to plaintext.

4. The system of claim 1 wherein the computing device is configured to generate a pseudorandom bit string for one or more URLs.

5. The system of claim 1 wherein the computing device is configured to divide one or more data strings that are greater than a specified data block size into one or more data blocks.

6. The system of claim 5 wherein the computing device is configured to assign an index to each of the one or more data blocks.

7. The system of claim 5 wherein the computing device is configured to pad the one or more data blocks with one or more extra characters, and thereby obscure the number of plaintext characters represented in the one or more data blocks.

8. A method of protecting access to electronic data by way of a key, the method comprising:
    receiving user data at a computing device;
    generating at least two first key segments using at least a portion of the user data;
    generating at least two second key segments using the at least two first key segments and the key;
    regenerating the at least two first key segments,
    recreating the key, K, using the at least two first key segments and the at least two second key segments using the equation:

$u_1 = d_2 x_1 - x_2$;

$v = d_1 d_2 - 1$; and $K = u_1 / v_1$;

wherein $d_1$ and $d_2$ are the first key segments, and $x_1$ and $x_2$ are the second key segments.

9. The method of claim 8 wherein the at least two second key segments are generated using an ephemeral bit string.

10. The method of claim 8 wherein generating at least two first key segments comprises:
    generating encryption bit strings by hashing and then encrypting a message using Advanced Encryption Standard (AES);
    xor-ing the encryption bit strings with plaintext.

11. The method of claim 8, wherein each key segment is one or more encryption bit strings and each of the one or more encryption bit strings is generated to be different for every distinct value encrypted.

12. The method of claim 8 comprising:
    generating a unique pseudorandom bit string for a URL, whereby the unique pseudorandom bit string is generated when the URL is initially registered with the server and is recalculated each time information bound to the URL is changed;
    interpreting the user data as one or more data strings and dividing the one or more data strings that exceed a specified data block size into one or more data blocks; and
    padding the one or more data blocks that are lesser than the specified data block size with one or more extra characters, whereby the number of plaintext characters in each of the one or more data blocks are obscured.

13. The method of claim 12 comprising assigning an index to each of the one or more data blocks.

14. The method of claim 12 comprising:
    assigning a counter variable to each of the one or more bit strings corresponding to the same URL to track multiple values associated with the URL; and
    embedding the counter variable an encryption bit string.

15. The method of claim 8 comprising:
    generating a static key, a passphrase and a pseudorandom bit string from the user data;
    generating two private key bit strings derived from the passphrase;
    utilizing the two private key bit strings and the pseudorandom bit string to encrypt the static key into at least two key segments;
    concatenating the at least two key segments to form one or more data blocks in accordance with a specified data block size, whereby any of the at least two key segments that exceeds the data block size is divided into two or more key segment bit strings; and
    padding any of the two or more key segment bit strings, or the at least two key segments, that are less than the specified data block size with one or more characters.

16. The method of claim 15 comprising encrypting plaintext into ciphertext by padding any of the two or more key segment bit strings, or the at least two key segments that are less than the specified data block size.

17. A computing device comprising:
    at least on memory; and
    at least on processor configured for:
        receiving user data;
        generating at least two first key segments using at least a portion of the user data;
        generating at least two second key segments using the at least two first key segments and an encryption key, the encryption key required to access electronic data;
        regenerating the at least two first key segments,
        recreating the encryption key, K, using the at least two first key segments and the at least two second key segments using the equation:

$u_1 = d_2 x_1 - x_2$;

$v = d_1 d_2 - 1$; and $K = u_1 / v_1$;

wherein $d_1$ and $d_2$ are the first key segments, and $x_1$ and $x_2$ are the second key segments.

18. The system of claim 1 wherein the at least two second key segments are generated using the equations:

$x_1 = d_1 K + S$; and $x_2 = K + d_2 S$;

wherein S is an ephemeral bit string.

19. The method of claim 8 wherein the at least two second key segments are generated using the equations:

$x_1 = d_1 K + S$; and $x_2 = K + d_2 S$;

wherein S is an ephemeral bit string.

20. The electronic device of claim 17 wherein the at least two second key segments are generated using the equations:

$x_1 = d_1 K + S$; and $x_2 = K + d_2 S$;

wherein S is an ephemeral bit string.

* * * * *